United States Patent
Runde

(10) Patent No.: US 10,215,220 B2
(45) Date of Patent: Feb. 26, 2019

(54) BOWDEN CABLE WITH COMBINED SPLITTER AND COMPENSATOR

(71) Applicant: Magna Seating Inc, Aurora (CA)

(72) Inventor: David M Runde, Beverly Hills, MI (US)

(73) Assignee: Magna Seating Inc, Aurora, Ontario (CA)

(*) Notice: Subject to any disclaimer, the term of this patent is extended or adjusted under 35 U.S.C. 154(b) by 0 days.

(21) Appl. No.: 15/673,888

(22) Filed: Aug. 10, 2017

(65) Prior Publication Data

US 2018/0045240 A1    Feb. 15, 2018

Related U.S. Application Data

(60) Provisional application No. 62/374,094, filed on Aug. 12, 2016.

(51) Int. Cl.
| | |
|---|---|
| *F16C 1/10* | (2006.01) |
| *B60T 7/10* | (2006.01) |
| *F16D 65/44* | (2006.01) |
| *F16C 1/22* | (2006.01) |

(52) U.S. Cl.
CPC ............. *F16C 1/101* (2013.01); *B60T 7/108* (2013.01); *F16C 1/106* (2013.01); *F16C 1/223* (2013.01); *F16D 65/44* (2013.01); *F16C 2326/08* (2013.01)

(58) Field of Classification Search
CPC .... F16C 1/00; F16C 1/10; F16C 1/101; F16C 1/106; F16C 1/12; F16C 1/20; F16C 1/22; F16C 1/223; F16C 1/226; F16C 1/26; B60T 7/108; F16D 65/38; F16D 65/40; F16D 65/42; F16D 65/44; F16D 2065/383
USPC ........ 74/500.5, 501.5 R, 502.4, 502.5, 502.6
See application file for complete search history.

(56) References Cited

U.S. PATENT DOCUMENTS

| | | | | |
|---|---|---|---|---|
| 4,197,763 A * | 4/1980 | Yamada | ................. | B62K 23/04 |
| | | | | 74/489 |
| 4,396,815 A * | 8/1983 | Kobayashi | ........... | H01H 3/0226 |
| | | | | 200/546 |
| 4,914,971 A * | 4/1990 | Hinkens | .................. | B60T 11/06 |
| | | | | 188/24.19 |
| 5,138,898 A | 8/1992 | Pospisil et al. | | |
| 5,829,314 A * | 11/1998 | Scura | ...................... | B60T 11/06 |
| | | | | 74/502.4 |
| 6,085,611 A * | 7/2000 | Valdez | ...................... | B62L 1/00 |
| | | | | 74/501.6 |
| 7,350,870 B2 * | 4/2008 | Bates | .................. | B60N 2/0881 |
| | | | | 297/463.1 |

(Continued)

*Primary Examiner* — Prasad V Gokhale
(74) *Attorney, Agent, or Firm* — Miller Canfield

(57) ABSTRACT

A cable assembly is provided for use with Bowden cables that combines a splitter and compensator. The cable assembly includes a hollow housing having a longitudinal axis, a first end defining a first aperture for receiving the wire of an input cable, and a second end defining a second aperture for receiving the wires of the output cables. A slider is provided within the housing for joining the wires of the input and output cables. The slider is configured for movement within the housing and along the axis. A conduit cap fixes the conduits of the output cables to one another. The conduit cap is configured for movement within the housing. A compression spring is configured to bias the conduit cap away from the first end of the housing.

10 Claims, 2 Drawing Sheets

(56) References Cited

U.S. PATENT DOCUMENTS

| | | | | |
|---|---|---|---|---|
| 8,857,288 B2* | 10/2014 | Sano | ................ | F16C 1/101 |
| | | | | 74/502.4 |
| 2006/0053939 A1* | 3/2006 | Basile | ................ | F16C 1/22 |
| | | | | 74/501.5 R |
| 2006/0053946 A1* | 3/2006 | Yamanaka | ............ | B60T 11/046 |
| | | | | 74/502.6 |
| 2008/0257099 A1* | 10/2008 | Prat Terrades | ............ | F16C 1/22 |
| | | | | 74/502.6 |
| 2013/0247709 A1* | 9/2013 | Sano | ................ | F16C 1/101 |
| | | | | 74/502.6 |

* cited by examiner

BOWDEN CABLE WITH COMBINED SPLITTER AND COMPENSATOR

CROSS-REFERENCE TO RELATED APPLICATIONS

This application claims priority based on U.S. provisional application No. 62/374,094 filed on Aug. 12, 2016, which is herein incorporated by reference.

BACKGROUND OF THE INVENTION

1. Field of the Invention

The present invention relates to the field of Bowden cables. More specifically, the present invention relates to a Bowden cable having an integrated splitter and compensator assembly.

2. Description of Related Art

Bowden cables are used in various applications to transmit mechanical forces, often as part of mechanical actuation systems. For example, Bowden cables are often found on bicycles, to transmit braking forces or gear shift inputs from the handlebars to the braking system or derailleur. Other applications include engine throttles, mechanical control systems, and latching mechanisms such as for automotive seating.

Generally speaking, a Bowden cable comprises a flexible conduit which surrounds a central wire. The conduit is typically fixed at both ends. The wire slides within the conduit, thereby transmitting mechanical forces along the length of the cable. Some conduits may include an inner sleeve to reduce friction and/or an outer coating to protect the conduit.

In some applications, it is desirable to have a single mechanical input on one Bowden cable transmitted to two or more other Bowden cables. For example, in the field of automotive seating, it may be desirable to have a single lever operate two functions of a seating system.

A mechanical splitter for a Bowden cable is described in U.S. Pat. No. 7,350,870, in which a force applied to a primary cable is transmitted to two secondary cables. A splitter unit connects the primary and secondary cables via a slider mechanism. A compensator unit is provided separately for each secondary cable, to protect against overextension thereof. The resulting assembly allows a single mechanical action to be split into two separate forces.

Generally speaking, the cost to manufacture a component depends in part on its complexity, both in terms of manufacture and the number of components. In some applications, the physical size of a cable assembly is also of importance, particularly where the cable must be integrated within other structures or otherwise hidden from view.

SUMMARY OF THE INVENTION

The invention provides a cable assembly that combines a splitter and compensator, while also reducing the number of components in the assembly and the overall size of the unit.

The cable assembly according to the present invention is intended for use with an input cable and at least two output cables. The input cable has an input wire surrounded by an input conduit. Each of the at least two output cables has an output cable surrounded by an output conduit.

In one broad aspect, the cable assembly includes a hollow housing having a longitudinal axis. The hollow housing has a first end disposed along the axis defining a first aperture for receiving the input wire and a second end disposed along the axis defining a second aperture for receiving the at least two output cables. A slider is provided within the housing for connecting the input wire to the at least two output wires. The slider is configured for movement within the housing and along the axis. A conduit cap is provided within the housing for fixing the output conduits to one another. The conduit cap is configured for movement along the axis and defines two or more wire apertures for receiving the at least two output wires. A compression spring is provided within the housing and is disposed along the axis. The compression spring is configured to bias the conduit cap away from the first end of the housing.

In some embodiments, the compression spring surrounds the slider. The assembly may also include a shoulder configured to prevent the conduit cap from exiting the aperture.

The slider may be configured for movement between a rest position, an activation position, and an overextension position. In some cases the spring may be pre-tensioned so as to bias the conduit cap toward the second end when the slider is in the rest position or the activation position. In some embodiments, the spring may be configured to permit the conduit cap to move toward the first end when the slider enters the overextension position.

Guides may also be included to guide movement of the conduit cap along the axis. In some embodiments, the conduit cap may be configured to receive three, four, five, six, or more output cables.

The housing may include a portion at the first end to fix the input conduit to the assembly. The second end of the housing may also be removable, to simplify access and/or manufacture of the cable assembly.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Figure 1:
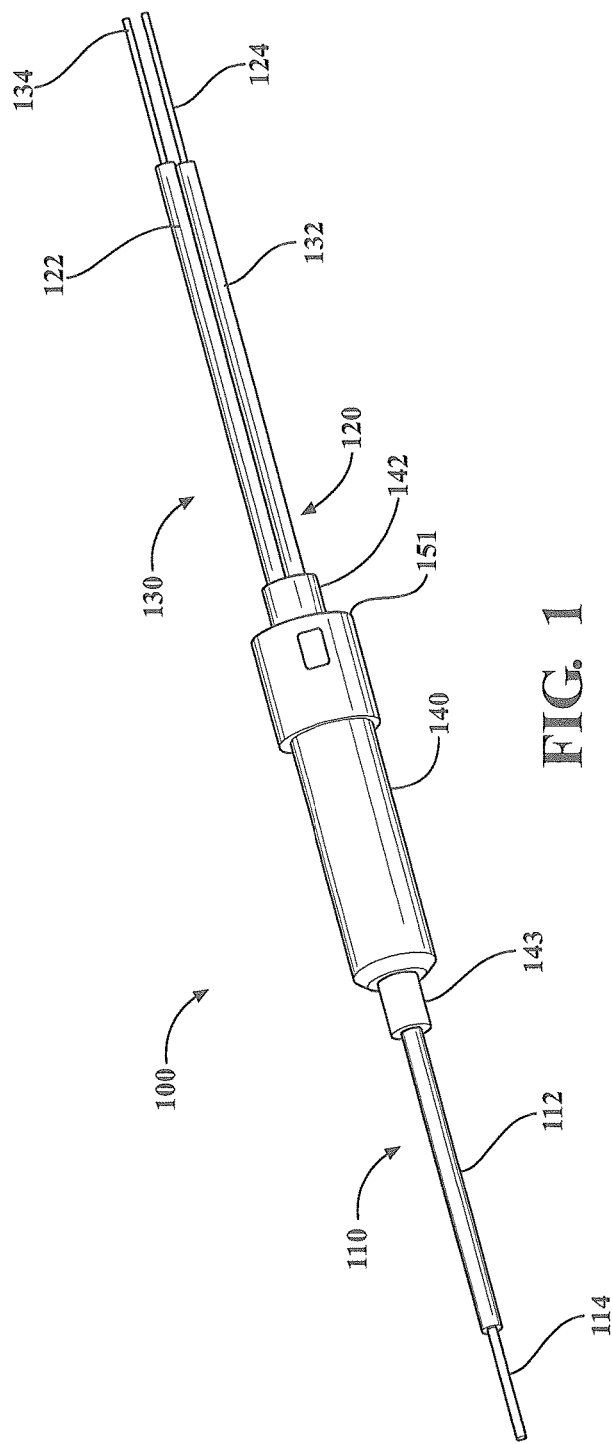
FIG. 1 is a perspective view of a cable assembly according to an embodiment of the present invention.

Referring to FIG. 1, the cable assembly 100 according to the present invention generally comprises a housing 140. The first end 143 of the housing 140 receives an input cable 110 and the second end 142 of the housing 140 receives two or more output cables 120, 130.

The input cable 110 comprises a conduit 112 which surrounds an input wire 114. The conduit 112 may have a single or multi-layered construction, as appropriate for the application. In preferred embodiments, the input cable 110 is connected to a lever, solenoid, servo, or other source of mechanical force. In the embodiment shown in FIGS. 1-4, the first end 143 of the housing 140 includes a portion for retaining the conduit 112 of the input cable 110.

Each output cable 120, 130 comprises a conduit 122, 132 which surrounds an output wire 124, 134. The conduit 122, 132 may have a single or multi-layered construction, as appropriate for the application. In preferred embodiments, each of the output wires 124, 134 are connected to a device to be actuated, such as a latch on a vehicle seat, a bicycle brake, a valve, a vehicle throttle, or the like.

Figure 2:
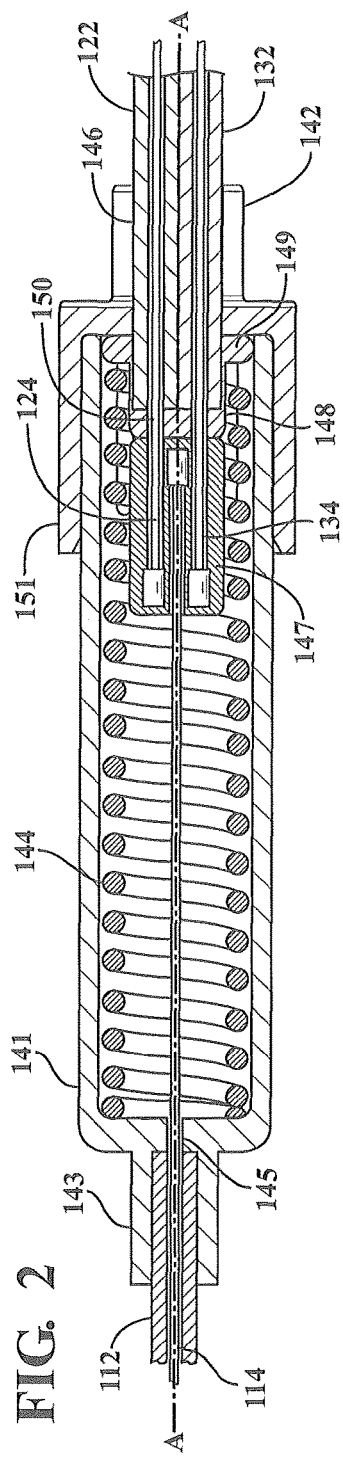
FIG. 2 is a cross-sectional view of the cable assembly of FIG. 1, in a resting position.

Referring to FIGS. 1-2, the housing 140 has a longitudinal axis A-A along which the internal components of the assembly 100 are generally aligned. In this embodiment, the housing 140 is constructed from plastic and is divided into a body 141 and a cap 151, which provides for easier access to and assembly of the various components of the cable assembly 100.

In the embodiment shown in FIG. 2, the first end 143 of the housing 140 includes a first aperture 145, through which the input wire 114 can pass. The second end 142 of the housing 140 includes a second aperture 146, through which the output cables 120, 130 can pass.

A slider 147 moves within the housing 140 along axis A-A. The slider 147 joins the inner wire 114 of the input cable 110 to the inner wires 124,134 of the output cables 120,130. In the embodiment shown in FIGS. 2-4, the slider is a metal slug with T-shaped receiving channels for the various wires 114, 124, 134. Numerous other suitable configurations would be readily apparent to the person of skill in view of the present disclosure.

The conduits 122, 132 of the output cables 120, 130 are joined to one another by a conduit cap 148 that includes one or more apertures 150 through which the output wires 124, 134 may pass. The conduit cap 148 is configured to travel within the housing 140, along the axis A-A. In preferred embodiments, the conduit cap 148 includes a shoulder 149 that prevents the conduit cap 148 from exiting the housing 140.

A spring 144 is disposed along axis A-A and serves as a compensator for the assembly 100. The spring 144 biases the conduit cap 148 away from the first end 143 of the housing 140. The slider 147 travels within the housing 140 independently of the spring 144. In preferred embodiments (e.g. FIGS. 2-4), the overall size of the assembly 100 is minimized by using a spring 144 that surrounds (but is not connected to) the slider 147.

The conduit cap 148 may be connected directly or indirectly to the spring 144 in a variety of ways. In a preferred embodiment, the shoulder 149 serves as a direct point of contact between the conduit cap 148 and the spring 144.

In operation, the assembly 100 serves as a combined splitter and compensator. Forces applied to the input cable 110 are thereby transmitted to the output cables 120, 130, with some protection against overextension thereof.

Figure 3:
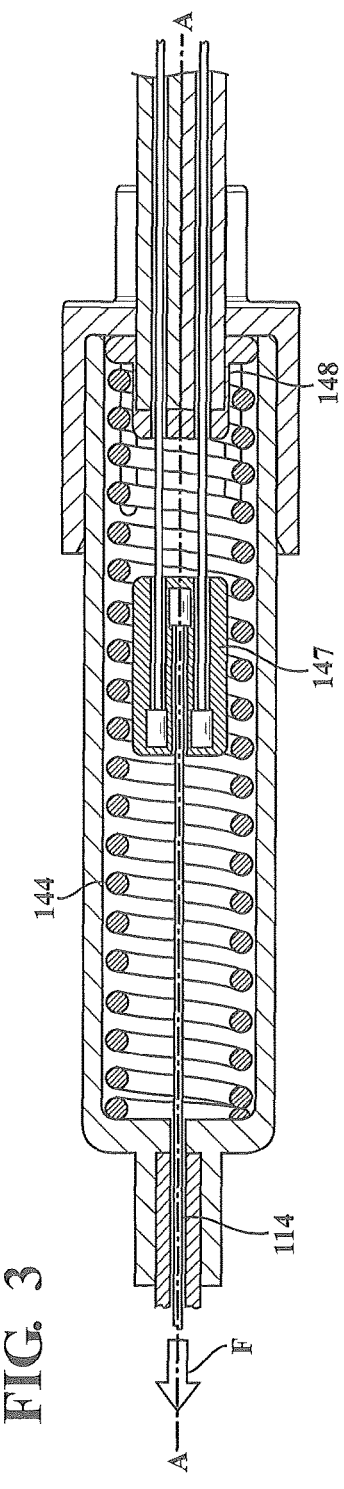
FIG. 3 is a cross-sectional view of the cable assembly of FIG. 1, in a activation position.
Figure 4:
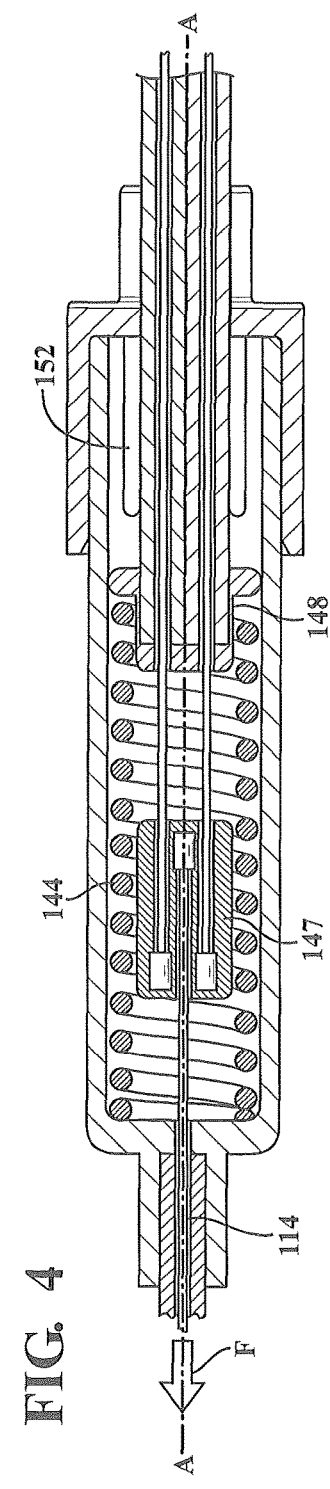
FIG. 4 is a cross-sectional view of the cable assembly of FIG. 1, in an overextension position.

FIGS. 2-4 show the assembly in a resting state (FIG. 2), an activation state (FIG. 3), and an overextension state (FIG. 4).

In the resting state (FIG. 2), the spring 144 may be relaxed, or in embodiments where the spring 144 is pre-tensioned the spring may actively press the conduit cap 148 toward the second end 142 of the housing 140. If the spring 144 is pre-tensioned, it may be desirable to include a shoulder 149 on the conduit cap 148 to prevent the conduit cap 148 from exiting the housing 140.

In the activation state (FIG. 3), an activation force F is applied to the input wire 114. Spring 144 provides an opposing force that is greater than or equal to the activation force F, thereby preventing the conduit cap 148 from moving toward the first end 143 of the housing 140. The output wires 124, 134 are extended by the slider 147 and are drawn into the housing 140 as input wire 114 is withdrawn from the assembly 100. This action serves to transmit the mechanical force F from the input cable 110 to the output cables 120, 130.

In the overextension state (FIG. 4), the output wires 124, 134 have reached their maximum operating extension. Rather than allowing the output wires 124, 134 to reach their breaking point, conduit cap 148 moves against the bias provided by the spring 144. In the embodiment shown in FIGS. 2-4, this draws a portion of the output cables 120, 130 into the housing 140. The resistance provided by the spring 144 may also urge the input wire 114 back to the activation state, if the activation force F diminishes.

This compensator arrangement limits the extension of the output wires 124, 134 relative to the output conduits 122, 132 and tends to favor the activation state, thereby reducing the likelihood of snapping the input 110 and/or output cables 120, 130 when under load.

The mechanical characteristics of the spring 144 can be used to control the maximum operating extension of the output wires 124, 134 and the point at which the assembly 100 enters the overextension state. For example, the use of a stiffer spring 144 or a pre-tensioned spring 144 may allow for a greater degree of extension of the output wires 124, 134 prior to entering the overextension state, whereas a softer spring 144 may allow for less extension of the output wires 124, 134 prior to entering the overextension state.

Numerous variations are contemplated within the scope of the present disclosure.

In some embodiments, the slider 147 and/or conduit cap 148 may travel along one or more guides provided in the interior of the housing 140. For example, as best seen in FIG. 4, the second end 142 of the housing 140 may include guide rails 152 upon which the conduit cap 148 is seated and/or may travel.

Likewise, the conduit cap 148 may be configured for use with more than two output cables 120, 130. For example, the input cable 110 may be linked by the assembly 100 to 3, 4, 5, 6, or more output cables 120, 130, as dictated by the application. Such additional output cables (not shown) may be accommodated by providing additional apertures 150 in the conduit cap 148 and configuring the conduit cap 148 in such a manner as to engage the various output conduits. Suitable arrangements would be apparent to the person of skill having regard to the present disclosure and include triangular, square, pentagonal, and hexagonal arrangements of the output cables about the axis A-A.

In some embodiments, the housing 140 may also have varying shapes. In preferred embodiments a cylindrical housing 140 is used to minimize the total size of the assembly 100. Nevertheless, other shapes may also be used as appropriate for the application.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described. The subject matter described herein and in the recited claims intends to cover and embrace all suitable changes in technology.

The invention claimed is:

1. A cable assembly for use with an input cable and at least two output cables, the input cable having an input wire surrounded by an input conduit, each of the at least two output cables having an output wire surrounded by an output conduit, the cable assembly comprising:

a hollow housing having a longitudinal axis, the hollow housing having:

a first end disposed along the longitudinal axis defining a first aperture for receiving the input wire of the input cable;

a second end disposed along the longitudinal axis defining a second aperture for receiving the at least two output cables;

a conduit cap within the housing for fixing the output conduits to one another, the conduit cap configured for movement along the longitudinal axis and defining two or more wire apertures for receiving the at least two output wires;

a slider within the housing for connecting the input wire to the at least two output wires, the slider configured for movement within the housing and along the longitudinal axis;

a compression spring within the housing and disposed along the longitudinal axis, the compression spring configured to bias the conduit cap away from the first end of the housing.

2. The cable assembly of claim 1, wherein the compression spring surrounds the slider.

3. The cable assembly of claim 1, wherein the conduit cap includes a shoulder configured to prevent egress of the conduit cap from the output aperture.

4. The cable assembly of claim 1, wherein the compression spring extends from the first end to the conduit cap.

5. The cable assembly of claim 1, wherein the slider is configured for movement between a rest position, an activation position, and an overextension position.

6. The cable assembly of claim 5, wherein the compression spring is pre-loaded to bias the conduit cap against the second end when the slider is in the rest position or activation position.

7. The cable assembly of claim 5, wherein the compression spring is configured to permit movement of the conduit cap toward the first end when the slider is in the overextension position.

8. The cable assembly of claim 1, wherein the second end includes at least one guide for guiding movement of the conduit cap along the longitudinal axis.

9. The cable assembly of claim 1, wherein the first end fixes the input conduit to the housing.

10. The cable assembly of claim 1, wherein the second end of the housing is a removable cap.

* * * * *